United States Patent
Travis

[19]

[11] Patent Number: 5,810,530
[45] Date of Patent: Sep. 22, 1998

[54] INTERFERENCE BLIND TYPE BOLT

[75] Inventor: Robert D. Travis, Tucson, Ariz.

[73] Assignee: Huck International, Inc., Tucson, Ariz.

[21] Appl. No.: 947,396

[22] Filed: Oct. 8, 1997

[51] Int. Cl.$^6$ .............................. F16B 13/04; F16B 13/06
[52] U.S. Cl. ................................ 411/34; 411/43; 411/69; 411/70
[58] Field of Search .................................. 411/34–38, 43, 411/55, 69, 70

[56] References Cited

U.S. PATENT DOCUMENTS

| | | |
|---|---|---|
| 2,341,598 | 2/1944 | Crowley . |
| 2,370,776 | 3/1945 | Carlson . |
| 2,392,133 | 1/1946 | Eklund . |
| 2,652,741 | 9/1953 | Ketchum et al. . |
| 2,789,619 | 4/1957 | Wing et al. . |
| 3,148,578 | 9/1964 | Gapp . |
| 3,253,495 | 5/1966 | Orloff . |
| 3,292,482 | 12/1966 | Fry et al. . |
| 3,302,510 | 2/1967 | Gap . |
| 3,369,289 | 2/1968 | Gapp . |
| 3,390,601 | 7/1968 | Summerlin . |
| 3,702,088 | 11/1972 | Schmitt . |
| 3,858,479 | 1/1975 | Sekhon . |
| 3,915,052 | 10/1975 | Ruhl . |
| 4,007,659 | 2/1977 | Stencel . |
| 4,012,984 | 3/1977 | Matuschek . |
| 4,074,608 | 2/1978 | Siebol . |
| 4,127,345 | 11/1978 | Angelosanto et al. . |
| 4,143,580 | 3/1979 | Luhm . |
| 4,347,728 | 9/1982 | Smith . |
| 4,355,934 | 10/1982 | Denham et al. . |
| 4,388,031 | 6/1983 | Rodgers . |
| 4,421,147 | 12/1983 | King et al. . |
| 4,457,652 | 7/1984 | Pratt . |
| 4,548,533 | 10/1985 | Pratt . |
| 4,580,435 | 4/1986 | Port et al. . |
| 4,627,775 | 12/1986 | Dixon . |
| 4,659,268 | 4/1987 | Del Mundo et al. . |
| 4,696,610 | 9/1987 | Wright . |
| 4,702,656 | 10/1987 | Kerrom . |
| 4,747,202 | 5/1988 | Beals . |
| 4,789,283 | 12/1988 | Crawford . |
| 4,815,906 | 3/1989 | Binns . |
| 4,828,483 | 5/1989 | Shackelford . |
| 4,844,673 | 7/1989 | Kendall . |
| 4,863,325 | 9/1989 | Smith . |
| 4,936,725 | 6/1990 | Eshraghi ................................ 411/70 X |
| 4,967,463 | 11/1990 | Pratt . |
| 5,052,870 | 10/1991 | Pratt et al. . |
| 5,131,107 | 7/1992 | Pratt et al. . |
| 5,135,340 | 8/1992 | Stinson . |
| 5,141,373 | 8/1992 | Kendall . |
| 5,252,014 | 10/1993 | Andrews . |
| 5,429,464 | 7/1995 | Eshraghi . |
| 5,569,006 | 10/1996 | Alvarado . |

FOREIGN PATENT DOCUMENTS 1228781   4/1971   United Kingdom ..................... 411/70

*Primary Examiner*—Neill R. Wilson
*Attorney, Agent, or Firm*—Harness, Dickey & Pierce P.L.C.

[57] ABSTRACT

A blind fastener has an assembly including an inner sleeve, an outer sleeve and a pin member and is adapted to be located in workpiece openings with the pin member having an expansion portion adapted to be pulled through the inner sleeve radially expanding both the inner and outer sleeves to provide an interference fit with the workpiece openings.

41 Claims, 6 Drawing Sheets

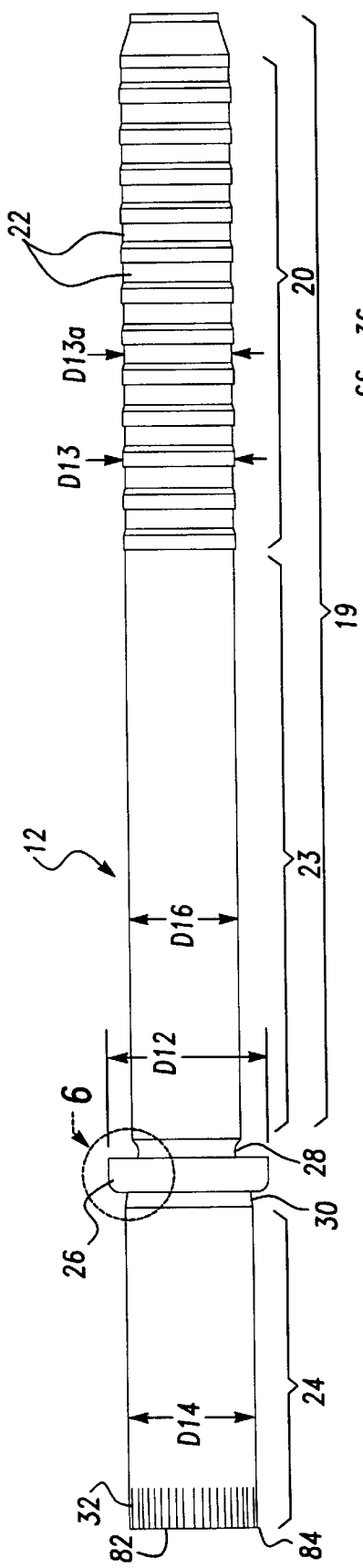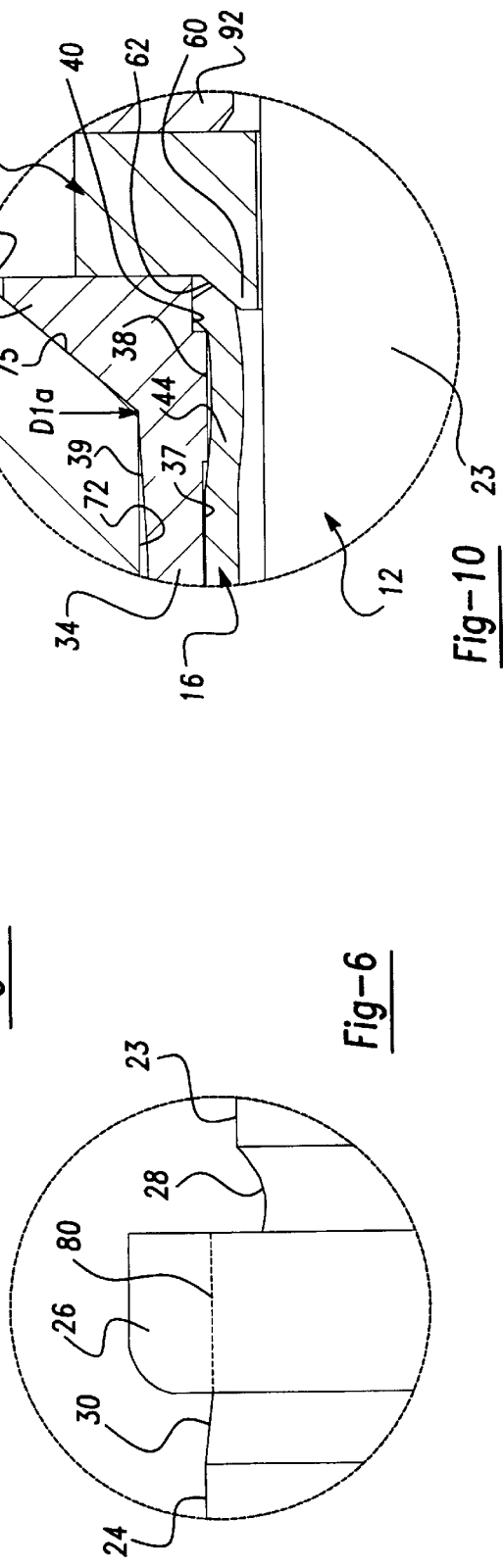
Fig-5
Fig-6
Fig-10

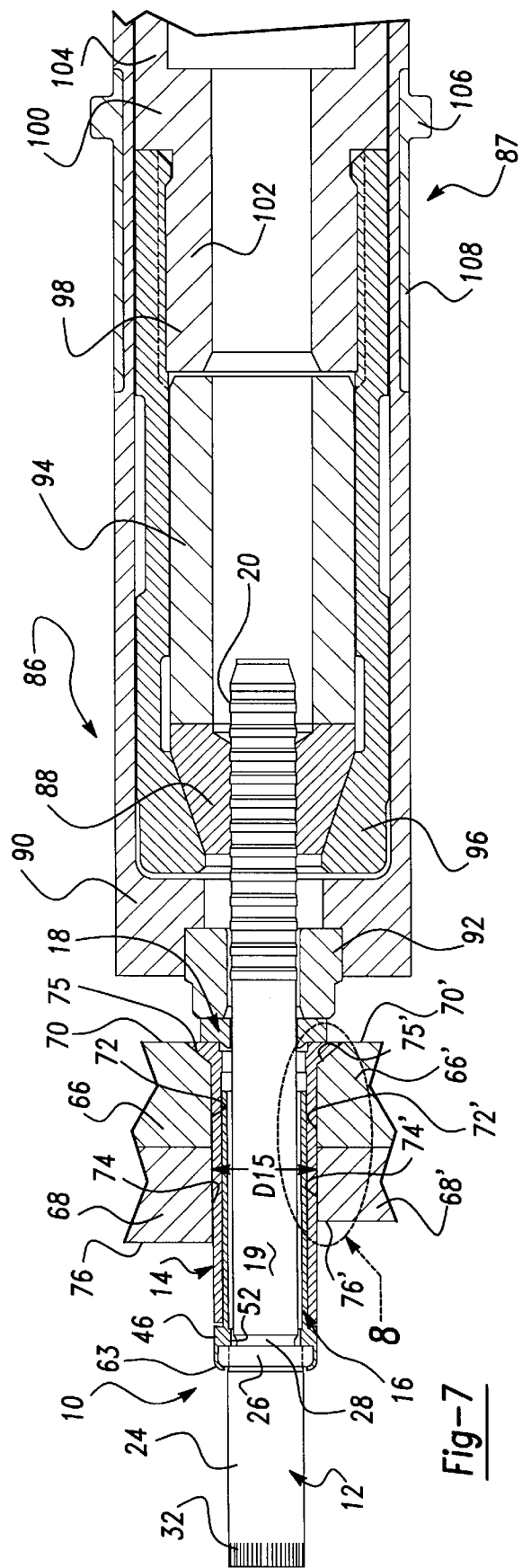
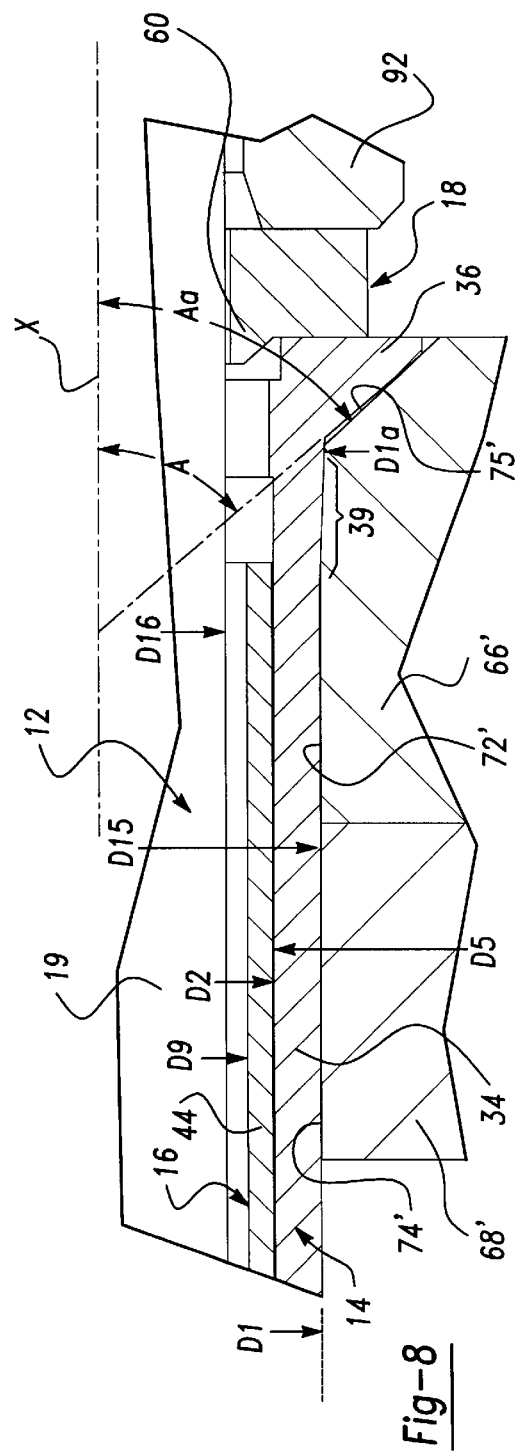
Fig-7
Fig-8

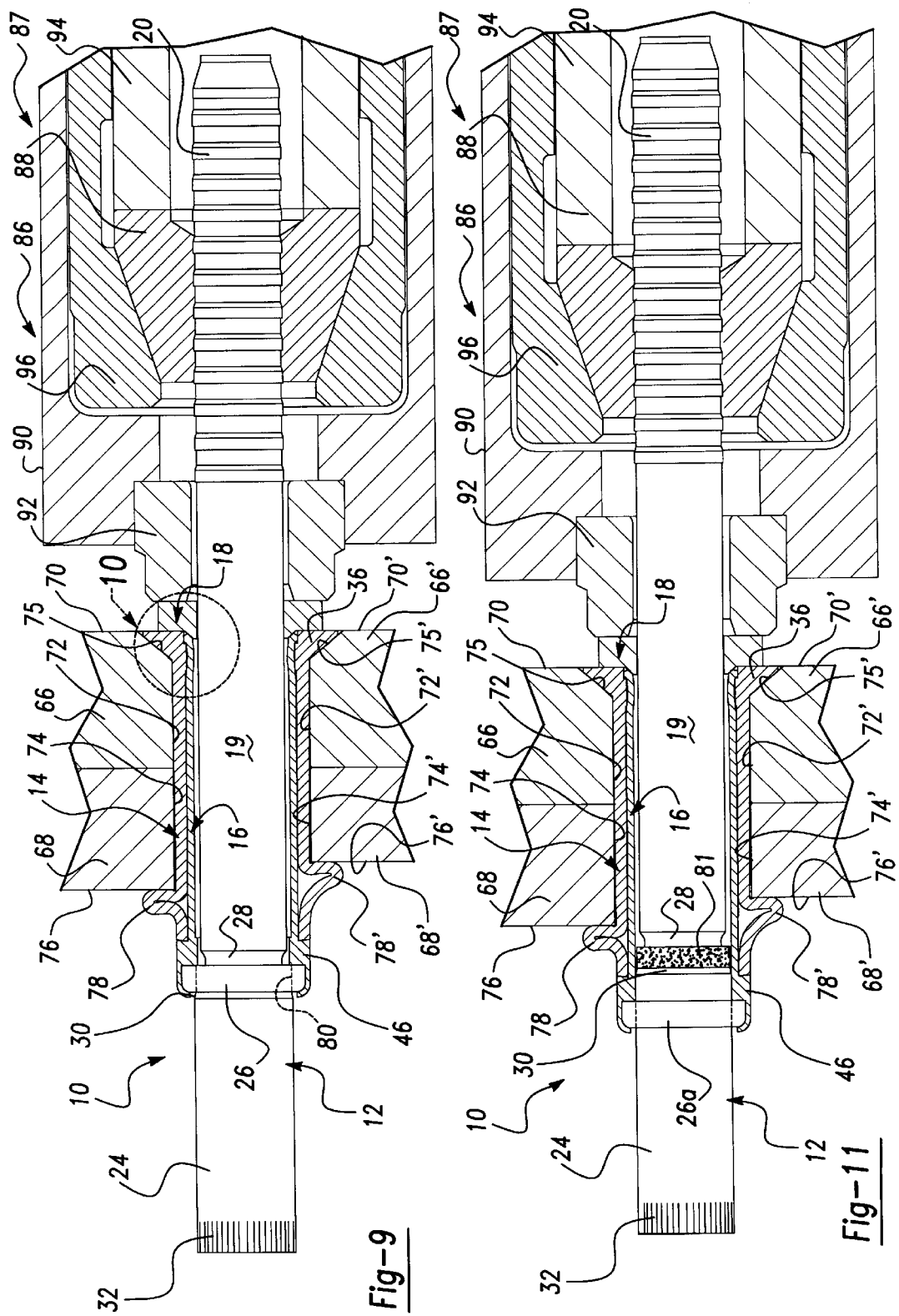

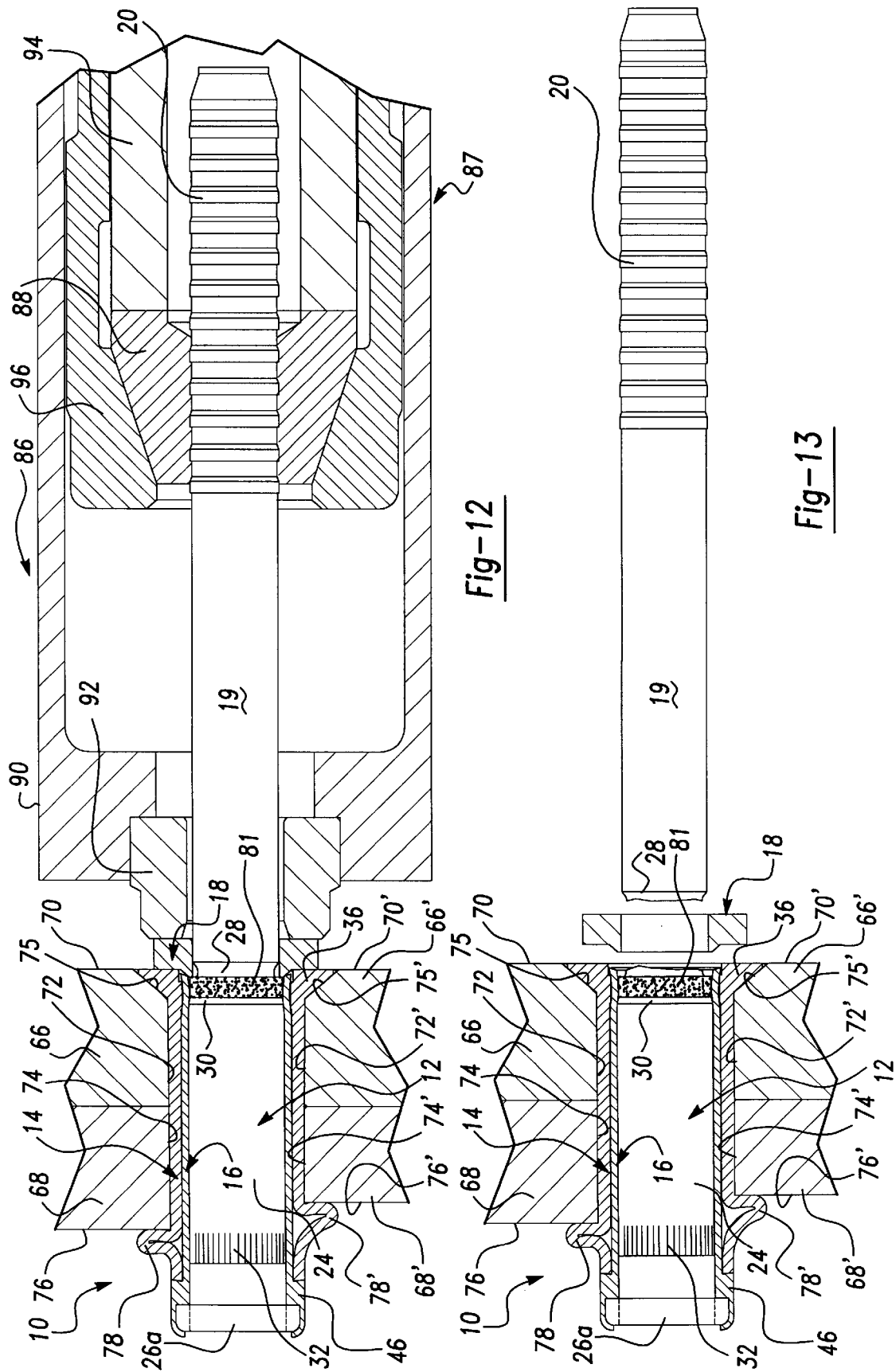

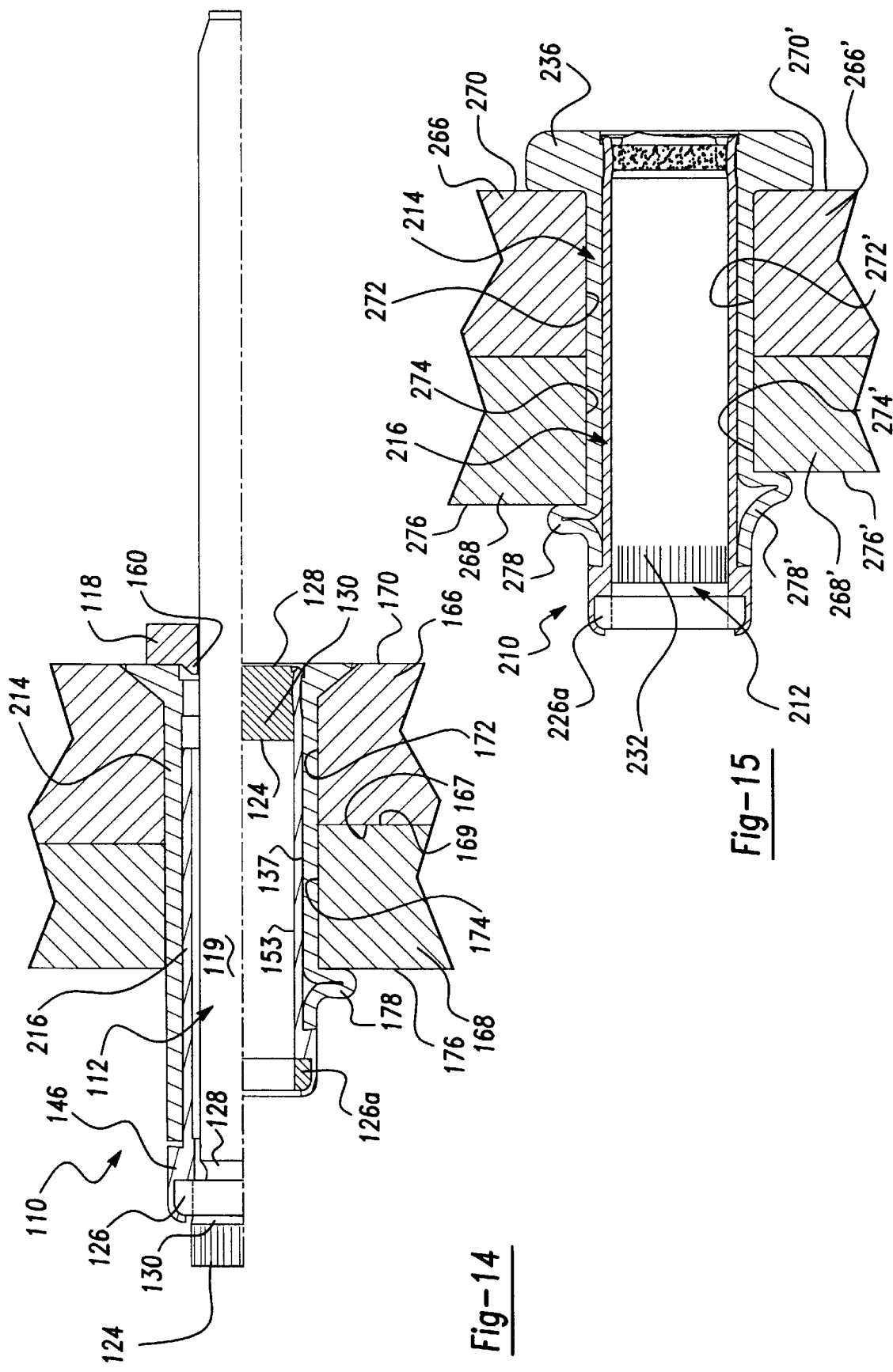

INTERFERENCE BLIND TYPE BOLT

SUMMARY BACKGROUND OF THE INVENTION

The present invention relates to multiple pieced fasteners and more particularly to a pull, blind type fastener initially operative in a generally clearance relationship with openings in workpieces to be secured together and being radially expanded to provide hole fill and an interference fit with the surfaces of the openings upon final installation.

The fastener of the present invention is a pull type fastener generally of the blind fastener type as shown in U.S. Pat. No. 3,702,088 issued Nov. 7, 1972 to Schmitt for "Double Shank Blind Bolt", U.S. Pat. No. 4,844,673 issued Jul. 4, 1989 to Kendall for "Lock Spindle Blind Bolt With Lock Collar Providing Pin Stop Support" and U.S. Pat. No. 4,627,775 issued Dec. 9, 1986 to Dixon for "Blind Fastener With Grip Compensating Means". Installation tools for installing such pull type blind fasteners are generally shown in U.S. Pat. No. 4,347,728 issued Sep. 7, 1982 to Smith for "Apparatus And System For Setting Fasteners" and U.S. Pat. No. 4,580,435 issued Apr. 8, 1986 to Port et al for "Installation Tool For Pull Type Fasteners".

In the present invention a blind fastener is provided including a pin and a pair of elongated interfitting or nested sleeves. An outer sleeve has a shank portion which is adapted to bulb or radially expand in response to column loading to form a bulbed head at the rearward or inaccessible side of the workpieces. An inner sleeve is nested within the outer sleeve and cooperates with a ring portion on the pin whereby the column load is applied to the outer sleeve in response to a relative axial force applied between the pin and the sleeves. At the same time the inner sleeve, which is adapted for a selected, fixed amount of axial movement relative to the outer sleeve, cooperates with a stop anvil supported on the pin member at the forward or accessible side of the workpieces to limit the magnitude of column loading to a desired magnitude sufficient to assure formation of the bulbed head on the outer sleeve over a selected grip range. When this occurs the ring portion is sheared or severed from the pin shank. With the ring portion severed, an enlarged diameter portion of the pin shank can now move axially through the ring portion and into the inner sleeve with a radial interference. This causes the inner and outer sleeves to expand radially moving the outer sleeve into engagement with the surfaces of the workpiece openings to thereby provide hole fill with a desired interference fit. Upon further increase in relative axial force between the pin and sleeves, the pin shank is constructed to sever at a location generally flush with the accessible side surface of the workpieces.

Thus it is an object of the present invention to provide a unique fastener for providing hole fill and a desired interference fit with related workpiece openings upon final installation.

It is another object of the present invention to provide a unique, interference fit bolt of the type described which is operable in different applications with workpieces varying in total thickness over a significant grip range.

It is still another object of the present invention to provide a unique bolt having a pair of interfitting and interacting sleeve members which are operative with a pin member to provide a hole filling or interference fit bolt having a high shear strength.

It is a general object of the present invention to provide a unique fastener of the above described type which can be used in applications where blind fasteners are typically used.

Other objects, features, and advantages of the present invention will become apparent from the subsequent description and the appended claims, taken in conjunction with the accompanying drawings, in which:

DESCRIPTION OF THE VIEWS OF THE DRAWINGS

FIG. 5 is a side elevational view of the pin of FIG. 1 to the same scale prior to assembly with the other components;

FIG. 6 is an enlarged, fragmentary view of the portion of the pin shown in the Circle 6 in FIG. 5;

FIG. 7 is a side elevational view of the fastener of FIG. 1 shown, prior to initiation of installation, in assembled relationship with a pair of workpieces to be secured together with the upper pair of workpieces depicting workpieces of total maximum thickness for the grip range of the fastener and the lower pair of workpieces depicting workpieces of total minimum thickness for the grip range; a portion of a nose assembly of an installation tool is shown in section as it would be applied to the fastener for installation;

FIG. 8 is an enlarged, fragmentary view of the portion of the assembly of FIG. 7 shown in the dotted area 8 in FIG. 7;

FIG. 9 is a side elevational view of the fastener of FIG. 7 after initiation of the installation cycle in which the bulbed head has been fully formed;

FIG. 10 is an enlarged, fragmentary view of the portion of the fastener of FIG. 9 shown in the Circle 10 in FIG. 9;

FIG. 11 is a side elevational view of the fastener of FIGS. 7 and 9 in which a ring portion of the pin has been sheared or severed from the shank of the pin;

FIG. 12 is a side elevational view of the fastener of FIGS. 7, 9 and 11 in which an enlarged diameter portion of the shank of the pin has moved into the inner sleeve to radially expand the inner and outer sleeves to fill the clearance with the surfaces of the workpiece openings to provide an interference fit;

FIG. 13 is a side elevational view of the fastener of FIG. 12 upon completion of the installation with a pull portion of the shank of the pin having been severed and with the nose assembly of the installation tool removed;

FIG. 14 is a side elevational view of a lightweight version of a fastener similar to FIG. 13 but with the expansion portion of the pin being of a substantially minimal length and shown with workpieces of a total maximum thickness and with the upper half of FIG. 14 depicting the pre-installed condition and the lower half depicting the installed condition; and FIG. 15 is a side elevational view similar to that of FIG. 13 of a modified form of fastener upon completion of installation with the outer sleeve having a protruding head and the expansion portion of the pin being of an increased length.

DESCRIPTION OF EMBODIMENTS OF THE INVENTION

Figure 1:
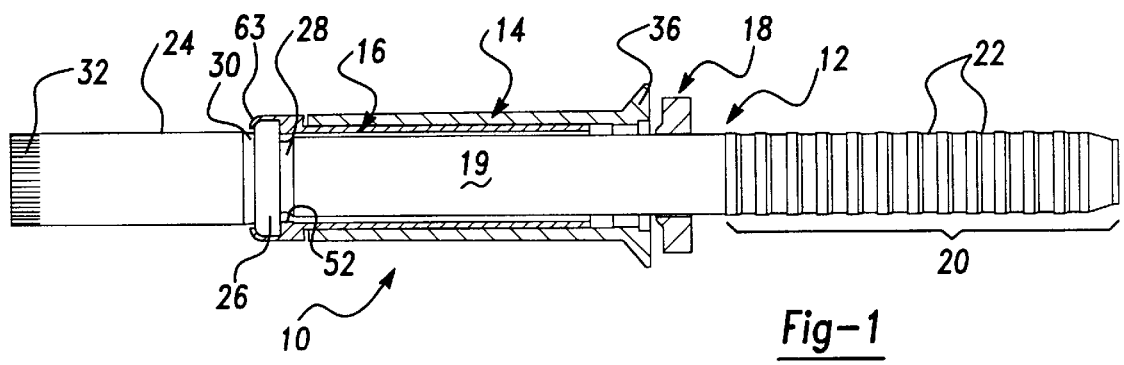
FIG. 1 is a side elevational view of a fastener of the present invention including a pin, an inner sleeve, an outer sleeve, and a stop anvil shown in assembly relationship, with the sleeves and stop anvil shown in section.

Looking now to FIGS. 1–5 of the drawings, a fastener 10 is shown and includes a pin 12, an outer sleeve 14, an inner sleeve 16, and a stop anvil 18. As will be seen, the fastener 10 is a pull type fastener adapted to be installed by an installation tool through the application of a relative axial force applied between the pin 12 and the outer sleeve 14 and inner sleeve 16 via the stop anvil 18. While the fastener 10 is shown and described in an application for a blind type fastener it should be noted that its unique features make it desirable in applications in which conventional non-blind fasteners are used.

Looking to FIGS. 1, 5 and 7, the pin 12 has an elongated shank with a pulling section 19 having a pull groove portion 20 at its forward or leading end which includes a plurality of annular pull grooves 22. The pull grooves 22 are adapted to be gripped by a plurality of jaws in a nose assembly of an installation tool whereby a relative axial force can be applied between the pin 12 and the sleeves 14 and 16 via the stop anvil 18. As will be seen the fastener 10 can be installed with an installation tool and nose assembly generally as shown in the '728 Smith patent (cited above) and modified for installation of a blind type fastener. Since the specific details of such tools do not constitute a part of the present invention and since such tools and nose assemblies are within the general purview of those skilled in the art, the full specific details thereof have been omitted for purposes of simplicity.

The shank of pin 12 also includes an enlarged diameter, generally smooth expansion shank portion 24 at its trailing or rearward end. The pin 12 includes a ring or engagement portion 26 of enlarged diameter which is located on the pin shank at the juncture of the pulling section 19 and the expansion portion 24. A reduced diameter breakneck groove 28 is located between the ring portion 26 and the pulling section 19 whereby the pulling section 19 with pull groove portion 20 can be severed from the remainder of the pin 12 at a preselected relative axial force at the completion of the installation. While the breakneck groove 28 is shown to be of the open type it should be understood that it could be of the closed type generally as shown in U.S. Pat. No. 3,292,482 issued to Fry for "Self-Plugging Blind Fastening Device"; see also U.S. Pat. No. 4,127,345 issued Nov. 28, 1978 to Angelosanto et al for "Lock Spindle Blind Fastener For Single Action Application". The outer or rearward end of the enlarged shank portion 24 terminates in a splined or roughened portion 32 for a purpose to be described.

Pull type blind fasteners having a pin shank with a ring portion adapted to be sheared from the shank during the installation cycle are generally shown in U.S. Pat. No. 3,148,578 issued Sep. 15, 1964 to Gapp for "Rivet And Method Of Riveting", U.S. Pat. No. 4,696,610 issued Sep. 19, 1987 to Wright for "Blind Fastener" and U.S. Pat. No. 5,569,006 issued Oct. 29, 1996 to Alvarado et al for "Bulb Fastener".

As will be seen, during the installation cycle, the ring portion 26 will be sheared from the pin 12 to form a separate ring section 26a thereby permitting the shank of the pin 12 to move axially relative to the sleeves 14, 16 with the smooth shank portion 24 moving through the severed ring section 26a. A limited, radially inwardly tapered groove portion 30 connects the rearward end of the ring portion 26 to the smooth shank portion 24 and assists in the shearing action and the movement of the smooth, enlarged pin shank portion 24 through the severed ring section 26a of the ring portion 26 and the movement through the inner sleeve bore.

Figure 2:
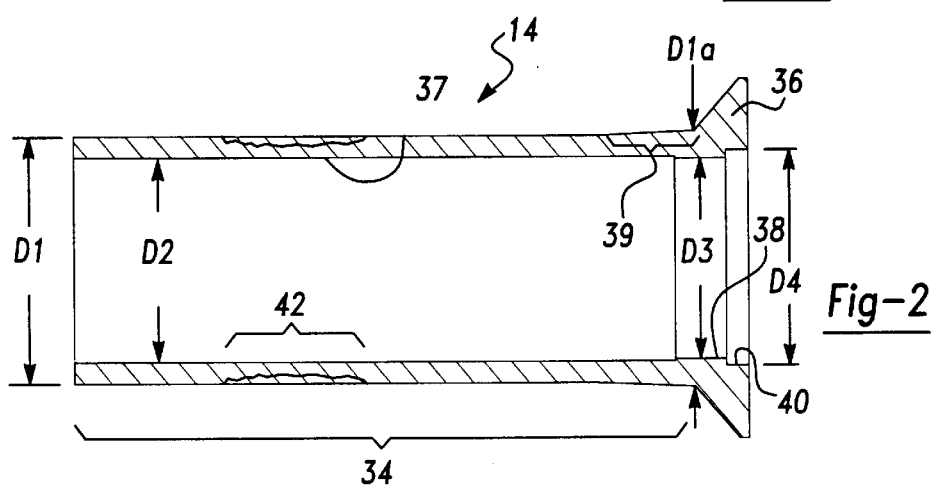
FIG. 2 is a side elevational sectional view, to enlarged scale, of the outer sleeve of the fastener of FIG. 1 prior to assembly with the other components.

Looking now to FIGS. 1, 2 and 7 the outer sleeve 14 is of a generally cylindrical construction having an elongated, generally straight shank portion 34 of a generally uniform outside diameter D1 terminating at its forward end in an enlarged countersunk or flush type head portion 36. In one form of the invention it is believed advantageous to provide the outer surface of a section 39 of shank portion 34 with a slight taper from outside diameter D1 at the inner end of shank portion 34 to a slightly larger outside diameter D1$a$ adjacent the head portion 36. The sleeve 14 has a through bore 37 generally uniform inside diameter D2 extending substantially through the shank portion 34 to an internal shoulder portion 38 near the head portion 36. Thus the wall thickness of the section 39 of shank portion 34 will increase slightly from the diameter D1 adjacent section 39 to the outer end at diameter D1$a$ for a purpose to be described. The shoulder portion 38 has a diameter D3 slightly less than diameter D2 and terminates in a generally straight counterbore 40 at the forward end of the head portion 36. The counterbore 40 is of a diameter D4 which is greater than shoulder diameter D3 and slightly greater than shank bore diameter D2 and serves a purpose to be described. The shoulder portion 38 is of a limited length and generally extends over the area of the juncture between the shank portion 34 and head portion 36.

As will be seen, the outer sleeve 14 is adapted to form a bulb type blind head under column loading during the installation cycle. In one form of the invention the sleeve 14 was made of a high strength steel with the shoulder portion 38 being formed in the punching and piercing operations in the manufacture of sleeve 14. In order to facilitate the bulb formation at a desired location, a selected section 42 of the sleeve shank portion 34 is band annealed to provide a reduced gradient of hardness. The utilization of an annealed portion of the shank of a sleeve for blind head formation is generally shown and described in U.S. Pat. No. 3,253,495 issued May 31, 1966 to Orloff for "Hardened Blind Bolt With Annealed Shank Portion".

Figure 3:
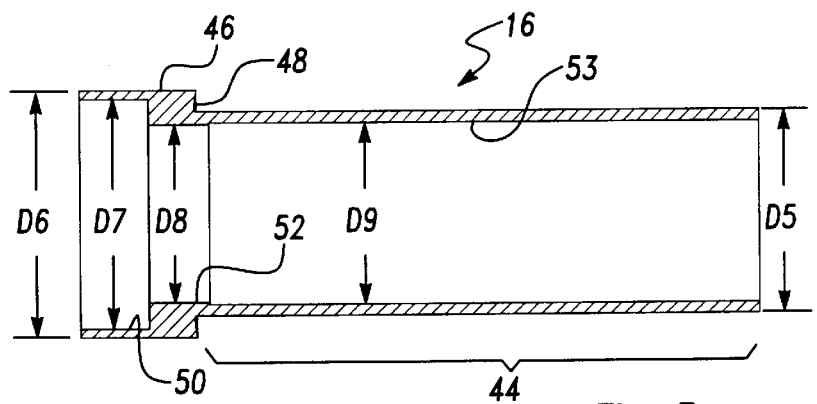
FIG. 3 is a side elevational sectional view, to enlarged scale, of the inner sleeve of the fastener of FIG. 1 prior to assembly with the other components.
Figure 4:
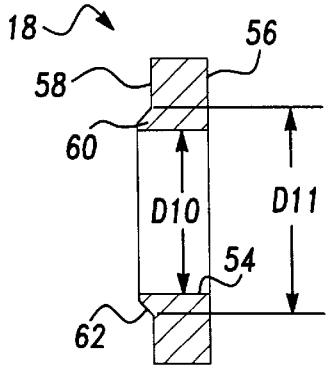
FIG. 4 is a side elevational sectional view to enlarged scale of the stop anvil of the fastener of FIG. 1 prior to assembly with the other components.

Looking now to FIGS. 1, 3 and 7, the inner sleeve 16 has an elongated shank portion 44 which terminates at its rearward end in an enlarged diameter, cylindrical head portion 46. The inner sleeve shank portion 44 is of a uniform outside diameter D5 which is slightly less than the inside diameter D2 of the outer sleeve shank portion 34 whereby the inner sleeve shank portion 44 can be located within the outer sleeve shank portion 34 with a close tolerance fit.

The cylindrical head portion 46 has a uniform outside diameter D6 which is equal to or slightly less than the outside diameter D1 of the outer sleeve shank portion 34. The forward end of the head portion 46 terminates in a radially inwardly, rearwardly tapering engagement surface 48 which is adapted to engage the confronting generally, radially straight rearward end of the outer sleeve shank portion 34. The slight taper of engagement surface 48 creates a radially inward force on the engaged end of outer sleeve shank portion 34 effectively adding to the overall hoop strength at this location whereby dilation of the end of outer sleeve shank portion 34 is inhibited.

The inner sleeve 16 has a through bore 53 of a generally uniform diameter D9. The enlarged head portion 46 is provided with a straight counterbore 50 of increased diameter D7 at its rearward end. A reduced diameter shoulder portion 52 of limited length is formed, in the punching and piercing manufacturing steps, at the juncture of the cylindrical head portion 46 and the shank portion 44. The diameter D8 of the shoulder portion 52 is just slightly less than the inside diameter D9 of the through bore 53.

Looking to FIGS. 1, 4, 7 and 10, the stop anvil 18 is generally ring shaped with a through bore 54 having a uniform diameter D10. The outer surface 56 of anvil 18 is generally planar while the inner surface 58 is also generally planar but terminates in an axially extending anvil portion 60 radially located adjacent to the bore 54. The radially outer surface 62 of the anvil portion 60 tapers radially inwardly from the inner anvil surface 58. As can be seen in FIGS. 7 and 10, the outer surface 62 of the anvil portion 60 has a maximum diameter D11 generally equal to the diameter D4 of the counterbore 40 of outer sleeve 14 whereby the anvil portion 60 can be freely received within the counterbore 40. In this regard the axial depth of the anvil portion 60 is selected to be slightly less than the axial length of the counterbore 40.

The above described components of the fastener 10 are preassembled in the manner shown in FIG. 1. Thus the pin 12 is first located in the inner sleeve 16 with the ring portion 26 located within the counterbore 50. The diameter D12 of ring portion 26 is slightly less than diameter D7 of the counterbore 50 while the axial length of the ring portion 26 is less than that of the counterbore 50. In the preassembled condition as noted, the outer, rearward end of the cylindrical head portion 46 is turned radially inwardly over the ring portion 26 to define an arcuately shaped retaining cap 63 to lock the pin 12 and the inner sleeve 16 together. In this pre-assembled condition, the pull grooves 22 of pull portion 20 have not yet been formed and thus the pulling section 19 of the shank of pin 12 is of a generally uniform diameter D16. The diameter D16 of the pulling section 19 is less than the diameter D8 of shoulder portion 52 and hence less than diameter D9 of the bore 53 of sleeve shank portion 44 whereby that part of the pulling section 19 which will later become the pull groove portion 20 of the pin 12 can extend freely through the inner sleeve 16. The inner sleeve 16 is then located within the outer sleeve 14 with the pull section 19 extending outwardly past the enlarged sleeve head portion 36 in clearance relationship with the diameter D3 of shoulder portion 38. The stop anvil 18 is then located over the pull section 19 of pin 12 prior to the formation of the pull grooves 22. Next the pull grooves 22 are formed by rolling with the crest diameter D13 of the pull grooves 22 being slightly greater than the diameter D10 of the anvil bore 54. Thus with the crest diameter D13 of the pull grooves 22 being slightly greater than the diameter D10 of the bore 54 of stop anvil 18 the anvil 18 will be held onto the pin 12. At the same time, the assembly of the components of the fastener 10 are also thereby held together to facilitate handling during installation. In this regard while the crest diameter D13 will be greater than the original shank diameter D16 the diameter D13a of the root of pull grooves 22 will be less than the original shank diameter D16. In addition to providing an effective means of holding the assembly together, by rolling the pull grooves 22 as noted, the diameter D16 of the remaining, smooth shank portion 23 can be maximized while still providing a relatively close clearance fit with the shank bore 53 of inner sleeve 16. At the same time, the root diameter D13a can be optimized whereby the overall strength of the pull section 19 will be maximized along with that of the breakneck groove 28. This allows the application of relative axial installation loads of a higher magnitude which provides a number of benefits. Thus this permits the wall thickness of the outer sleeve 14 to be maximized for the blind head 78 providing a higher strength blind head 78. A higher strength blind head 78 in turn assists in taking up any gap between workpieces 66 and 68 along with the maintenance of the clamp load and with increased final tensile strength. By contrast if the pull grooves (such as pull grooves 22) were formed on the pull section (such as section 19) to the same diameters as pull grooves 22 prior to assembly with the inner and outer sleeves then, for use in the same sized workpiece bores, the wall thicknesses of the respective sleeve shanks would have to be thinner in order to provide a sufficient diameter to receive such pull grooves. This would result in an overall reduction in the combined strength of the inner and outer sleeves.

Also the high strength pull section 19, as described above, allows for an increase in the amount of radial expansion of the outer sleeve 14 and inner sleeve 16, and interference with the confronting surfaces of workpiece bores 72, 74 and this also aids in providing improved hole fill and in forming a higher strength lock between the expansion shank portion 24 and the inner and outer sleeves 16 and 14, respectively. The general concept of rolling the pull grooves on a pin to hold an assembly of blind fastener components is shown in U.S. Pat. No. 4,863,325 issued Sep. 5, 1989 to Smith for "Two Piece Blind Fastener With Lock Spindle Construction".

As noted the blind fastener 10 is adapted for use in securing workpieces together varying in total thickness over a considerable grip range. The grip range of a fastener is the difference between the total thickness of workpieces from a minimum total thickness to a maximum total thickness which can be secured together by a common fastener. This is illustrated for the blind fastener 10 in the drawings of FIGS. 7, 9 and 11–13 which depict the various stages of the installation cycle.

Looking now to FIG. 7, the fastener 10 is shown in an assembled relationship with workpieces 66 and 68 which are of the maximum total thickness of the grip range of the blind fastener 10. At the same time the fastener 10 is shown in assembled relationship with workpieces 66' and 68' which illustrate workpieces of the minimum total thickness of workpieces to be secured together by the fastener 10. Unless described otherwise the primed numbered portions of workpieces 66' and 68' are essentially the same as the similarly numbered portions of workpieces 66 and 68 and vice versa.

Thus the front workpiece 66 (66') has an outer or forward surface 70 (70') at the accessible side for the fastener 10 while the rear workpiece 68 (68') has an inner or rearward surface 76 (76') at the inaccessible or blind side for the fastener 10. Prior to the initiation of the installation cycle the fastener 10 is located in aligned workpiece bores 72 (72') and 74 (74') in a generally predetermined clearance relationship. In this regard, the rounded contour of the retaining cap 63 facilitates the initiation of entry and passage of the enlarged head portion 46 of the inner sleeve 16 into the workpiece bores 72 (72') and 74 (74') and pre-assembly of the fastener 10 with the workpieces 66, 66' and 68, 68'. This ease of entry can be especially helpful in automated or robotic installations.

The bores 72 (72') and 74 (74') are provided to be of a uniform diameter D15 which is larger than diameter D1 at the inner end of outer sleeve shank portion 34 and less than diameter D1a at the outer end of sleeve shank portion 34. Thus in pre-assembly of the fastener 10 to the workpieces 66 (66') and 68 (68') the shank portion 34 is located in the aligned bores 72 (72') and 74 (74') with a clearance relationship except that there will be a slight interference between the shank portion 34 and the confronting portion of bore 72 (72') at the outer end of the workpiece (66 (66') as shank portion 34 reaches diameter D1a . In this regard, the fastener 10 can be pre-assembled to the workpieces 66 (66') and 68 (68') by simply applying a force via a tubular member against the stop anvil 18 to move the sleeve shank portion 34 fully into the workpiece bores 72 (72') and 74 (74') (see FIG. 8).

The bore 72 (72') in the front workpiece 66 (66') is provided with a countersunk portion 75 (75') adapted to receive the countersunk sleeve head portion 36. The included angle A of the surface under the countersunk head portion 36 is slightly greater than the included angle Aa of the surface of the countersunk bore portion 75 (75'). This initially provides engagement between the underside surface of countersunk head portion 36 and the surface of countersunk bore portion 75 (75') only at their radially outer ends (see FIG. 8). However, as relative axial force is applied in installing the fastener 10, the countersunk head portion 36 will deform to provide substantially full engagement with the surface of the countersunk bore portion 75 (75'). This is shown in FIG. 10 which depicts the outer surface of the countersunk head portion 36, originally at included angle A, having been deformed into engagement with the surface of countersunk bore portion 75 (75'). It should be noted that such deformation and engagement may occur later in the installation cycle. This type of construction is known in the art and is fully described in the '345 U.S. patent to Angelosanto et al noted above With the fastener 10 located in workpiece bores 72 (72'), 74 (74'), the expansion shank portion 24 of the pin 12 and the related portion of the sleeves 14 and 16 extend beyond the rearward or blind side surface 76 (76') of the rear workpiece 68 (68'). The expansion shank portion 24 is of a diameter D14 which is greater than the diameter D9 of bore 53 of shank portion 44 of inner sleeve 16 to provide radial expansion of sleeve shank portions 44 and 34 of sleeves 16 and 14 in a manner to be described. At the same time, the diameter D14 of shank portion 24 is less than the outside diameter D12 of ring portion 26 for a purpose to be described.

Looking to FIG. 7, the nose assembly 86 of a pull type installation tool 87 is then applied to the fastener 10 at the accessible or forward side of the workpiece 66 (66') with a plurality of gripping jaws 88 gripping the pull grooves 22 of the pull portion 20 of pin 12. At the same time an outer anvil housing 90 of the nose assembly 86 has an anvil member 92 which will be brought into engagement with the outer surface 56 of the stop anvil 18. The jaws 88 are actuably supported via an elastomeric sleeve 94 in a collet member 96 which in turn is supported within the anvil housing 90 for relative axial movement therewith. A threaded portion 98 at the forward end 102 of an adapter 100 is threadably connected to the collet member 96 while its rearward end 104 (only partially shown) is adapted to be connected to a piston rod (not shown) of the installation tool 87. Ears or lugs 106 of a connector sleeve 108 are adapted to be connected to a housing portion (not shown) of the installation tool 87 while the connector sleeve 108 is connected to the outer anvil housing 90. Thus when the installation tool is actuated to in turn actuate the nose assembly 86 a relative axial pulling force is applied between the collet member 96 and the anvil housing 90. This in turn results in a relative axial force being applied between the pin 12 via gripping jaws 88 and the stop anvil 18 via the nose anvil member 92. As this occurs the ring portion 26 moves the inner sleeve 16 forwardly with the engagement surface 48 in contact with the confronting end surface of the shank portion 34 of the outer sleeve 14. This causes a column load to be applied to the shank portion 34 of outer sleeve 14. As the relative axial force continues to be increased a magnitude is reached at which the annealed section 42 of the shank portion 34 will buckle radially outwardly to form a bulbed, blind head 78 (78') at a location adjacent to and in engagement with the blind side surface 76 (76') (see FIG. 9). It can be seen that the annealed section 42 of the shank portion 34 is formed such as to be located in line with the rear sheet blind surfaces 76 and 76' over the maximum and minimum total thicknesses of the grip range of the fastener 10 as exemplified by the workpieces 66, 68 and 66', 68'. As a result the buckling action will occur at the rear surfaces 76 and 76' with the bulbed head 78, 78' engaging the rear surfaces 76, 76' to pull the workpieces 66, 68 and 66', 68' together at a desired clamp load. Since the details of tools such as the installation tool 87 are well known in the art and do not constitute a part of the present invention, the details thereof have been omitted for purposes of simplicity.

As can be seen in FIGS. 9 and 10, after the blind head 78, 78' is fully formed the outer end of the shank portion 44 of the inner sleeve 16 is moved into engagement with the surface 62 of the anvil portion 60 of stop anvil 18. As noted, the anvil portion 60 has an inclined outer surface 62 which causes the engaging end of the inner sleeve 16 to be deformed radially outwardly over the shoulder portion 38 and into the cavity defined by the counterbore 40 at the outer end of the sleeve head portion 36 (see FIG. 10). This provides a mechanical lock between the inner sleeve 16 and the outer sleeve 14. Thus the engagement of the inner sleeve 16 with the stop anvil 18 and lock formation as noted along with the engagement of the blind head 78, 78' with the blind side surface 76, 76' will provide a stop of any further relative axial movement between the sleeves 14 and 16. At the same time increases in the relative axial load on the blind head 78, 78' are resisted in part by the engagement of inner sleeve 16 with stop anvil 18. This acts to inhibit distortion of the blind head 78, 78' from the increased loads to be applied.

Looking now to FIGS. 9 and 11, it can be seen that as the relative axial force is increased the load is applied between the ring portion 26 of the pin 12 and the stop anvil 18 via the inner sleeve 16 and the blind head 78, 78'. Further increases in this relative axial force then causes a ring section 26*a* of the ring portion 26 to shear or sever from the shank of the pin 12 along an annular shear plane 80 (see FIG. 6). The shear plane 80 of the ring portion 26 is generally defined by the engaged end surface of counterbore 50, which terminates in the inside diameter D8 of shoulder portion 52, and by the root of the tapered groove portion 30. As noted, the diameter D8 is less than the diameter D14 of the smooth shank portion 24. This results in the severed ring section 26*a* of ring portion 26 being radially expanded as the smooth shank portion 24 moves axially into it along the shear plane 80. The tapered groove portion 30 defines a transition from a diameter generally around diameter D8 of shoulder portion 52 and the shear plane 80 of the ring portion 26 and to the enlarged diameter D14 of the shank portion 24; this facilitates the shearing and radial expansion of the severed ring section 26*a* from ring portion 26 onto the larger diameter pin shank portion 24. An annular portion 81 is defined on the pin 12 in the area of the shear plane 80 after the ring section 26*a* has been severed.

After the severance of the ring section 26*a* the smooth shank portion 24 is pulled into the bore 53 of the sleeve portion 44 of the inner sleeve 16. Since the diameter D9 of the bore 53 is less than the diameter D14 of the expansion shank portion 24, the sleeve shank portion 44 of the inner sleeve 16 is expanded radially outwardly which in turn, expands the sleeve shank portion 34 of the outer sleeve 14 radially outwardly. This results in the sleeve shank portion 34 of the outer sleeve 14 filling the clearance between the shank portion 34 and the confronting surfaces of the workpiece bores 72 (72') and 74 (74') providing an interference fit with these bore surfaces.

The pin 12 continues to be pulled through the inner sleeve 16 until the outer end of shank portion 24 engages the inner end of the anvil portion 60 of stop anvil 18 (see FIG. 12). At this juncture the inner sleeve shank portion 44 and outer sleeve shank portion 34 have been further expanded slightly in the area of increased wall thickness of sleeve shank portion 34 adjacent countersunk head portion 36 at the vicinity of diameter D1a. The confronting portion of the expansion shank portion 24 can neck down or extrude slightly to accommodate the additional interference fit at this location. It is believed that this construction assures a positive interference of a desirable magnitude at this location which enhances the strength and fatigue characteristics of the fastener 10 and fastened joint.

After engagement of the outer end of expansion shank portion 24 with the anvil portion 60 of stop anvil 18, the relative axial force between the pin 12 and the stop anvil 18 continues to increase until a magnitude is reached at which the pull section 19, including the pull portion 20, of the pin 12 is severed from the remainder of the pin 12 at the breakneck groove 28. At this point the installation is completed; the nose assembly 86 is removed and the stop anvil 18 is freed and is removed along with the severed pull section 19. The result is the finally installed fastener 10 as shown in FIG. 13.

It can be seen, that in final installation, the roughened or serrated portion 32 at the end of the smooth shank portion 24 has been moved into expanded engagement with the confronting portion of the bore 53 of the sleeve shank portion 44 of inner sleeve 16. At the same time, the end surface 82 of the shank portion 24 has been moved past the shoulder portion 52 of the inner sleeve 16. The end surface 82 is provided with a relative sharp radially outer edge 84. Thus as the end surface 82 is moved past the shoulder portion 52, the shoulder portion 52 will relax and move radially inwardly to overengage the end surface 82 to provide a lock which is enhanced by the relatively sharp outer edge 84. This plus the close engagement of the surface of bore 53 of inner sleeve shank portion 44 with the roughened or serrated surface 32 of pin shank portion 24 will result in a positive lock between the pin shank portion 24 and the inner sleeve 16 which will resist loosening from loading and vibration. At the same time the sheared ring section 26a of ring portion 26 will relax somewhat radially inwardly to define an additional interference and mechanical lock to retain the pin shank portion 24. In addition the resultant interference fit of the fastener 10 with workpiece bores 72, 72' and 74, 74' will provide a significant retention or locking action as further described below.

It should be noted that, upon final installation, the pin shank portion 24 and the sleeve shank portion 44 of inner sleeve 16 will be located with the outer sleeve 14 in bores 72, 74 co-extensively with the entire width of the workpieces 66, 68 in the maximum grip condition and also in bores 72', 74' co-extensively with the entire width of workpieces 66', 68' in the minimum grip condition. This provides for an installed fastener having a substantially uniform high shear strength for applications over the grip range. At the same time the pin shank portion 24 is of a sufficient length to extend into the blind head 78 (78') over the grip range whereby the strength and fatigue characteristics of the blind head 78 (78') are believed to be assisted (see FIG. 13).

Note also that the severed ring section 26a will be positively locked to the inner sleeve 16 by the retaining cap 63 after it has been severed and separated from the pin shank portion 24 whereby the loose location of this severed element at the blind side of the workpieces 66, 68 (66', 68') is precluded. In this regard, the overall length of the shank portion 24 then can be minimized since there is no need for it to have the extra length that might be otherwise required to retain the severed ring section 26a. Since the shank portion 24 is not required to hold the severed ring section 26a, the shank portion 24 can be of a reduced length resulting in a reduction in weight of the installed fastener 10.

The use of the inner sleeve 16 to provide the direct radial engagement with the outer sleeve 14 during radial expansion provides an advantage over blind rivets having a single expansion sleeve structure. In single sleeve structures as the sleeve is expanded radially by the direct contact with an expansion portion of the pin there will be a tendency for some of the sleeve material to be extruded forwardly as a result of the excess volume of sleeve material required to provide the desired interference fit with the workpiece bores. This could result in displacement of the sleeve head from its engagement with the associated workpiece surface. This is often referred to as "head rise". With the two sleeve construction of the present invention the forward extrusion of the material of the outer sleeve 14 is inhibited thus inhibiting displacement and head rise of the sleeve head 36. At the same time, any forward extrusion of the material of the inner sleeve 16 can be readily accommodated by flow of the extruded material into the volume of the counterbore 40 at the forward end of the head portion 36 and as directed by the outer surface 62 of the anvil portion 60 of stop anvil 18.

It is believed that this beneficial effect is the result of several factors. In the first place, the leading edge of radial expansion of sleeves 14 and 16 occurs first by the direct engagement of the inner sleeve 16 by the enlarged shank portion 24 of the pin 12. While some forward extrusion of the inner sleeve 16 may occur, forward extrusion of the outer sleeve 14 is inhibited by its separate radial expansion by the inner sleeve 16. In addition, while the inner and outer sleeves 14 and 16 are constructed of materials of similar strength, the wall thickness of the shank portion 44 of inner sleeve 16 is substantially less than the wall thickness of shank portion 34 of outer sleeve 14, i.e. in one form of the invention, as described below, the wall thickness of the shank portion 44 of inner sleeve 16 was around one half of the wall thickness of the shank portion 34 of outer sleeve 14. It is believed that the thinner wall thickness minimizes forward extrusion of the material of shank portion 44 while, at the same time, promoting its radial expansion to provide the hole fill of the workpiece bores 72, 74 with a desired inference fit. Also, as noted above, the volume of the counterbore 40 is selected to be sufficient to substantially retain any of the forwardly extruded material of the inner sleeve 16.

The resultant interference fit will result in some radial expansion of the workpiece bores 72, 74 which will provide a residual compressive force on the relatively thick walled shank portion 34 of outer sleeve 14. This in turn will provide a radial compressive force onto the shank portion 44 of inner sleeve 16 and in turn on the section of the expansion pin shank portion 24 engaged by the sleeve shank portion 44. The greater wall thickness of the shank portion 44 also results in the blind head 78 being of a substantially higher strength.

Thus in one embodiment of fastener 10, the pin 12 was constructed of an A286 steel cold worked and aged to a hardness of between around Knoop 440 to around Knoop 470 and having a tensile strength of around 200 KSI. The inner sleeve, 16 was constructed of an A286 steel cold worked and aged to a hardness of between around Knoop 420 to around Knoop 450 and tensile strength of around 180 KSI. The outer sleeve 14 was constructed of an A286 steel cold worked and aged to a hardness of between around Knoop 420 to around Knoop 450 and having a tensile strength of around 180 KSI; the annealed section 42 was band annealed over a gradient with a low hardness of between around Knoop 160 to around Knoop 190. The stop anvil 18 was constructed of 1144 steel hardened to between around Rc45 to around Rc60. It is believed that the stop anvil 18 can be made from any alloy steel capable of being either through hardened or case hardened to around that hardness. The workpieces 66 (66') and 68 (68') would typically be made of 2024-T351 aluminum having a hardness of between around Brinnel 115 to around Brinnel 125 and having a tensile strength of around 68 KSI.

In one embodiment of the fastener 10 the components made of the noted materials were formed with the following dimensions in inches:

| Outer Sleeve 14: | D1 | .2595 |
|---|---|---|
| | D1a | .2645 |
| | D2 | .209 |
| | D3 | .206 |
| | D4 | .212 |
| Inner Sleeve 16: | D5 | .208 |
| | D6 | .258 |
| | D7 | .238 |
| | D8 | .177 |
| | D9 | .180 |
| Stop Anvil 18: | D10 | .166 |
| | D11 | .205 |
| Pin 12: | D12 | .236 |
| | D13 | .172 |
| | D13a | .159 |
| | D16 | .165 |
| | D14 | .188 |
| Bores 72 (72'), 74, (74'): | D15 | .2615 |
| Included Angle With Axis X: | A | 51° ± .5° |
| | Aa | 50° ± .5° |

In addition, in the noted embodiment, the engagement surface 48 on inner sleeve 16 was tapered radially inwardly at an angle of around 12° relative to a line extending transversely to the central axis of the inner sleeve 16.

It can be seen that the sleeve shank portion 34 of outer sleeve 14 and of the sleeve shank portion 44 of inner sleeve 16 are of relatively thin walled constructions. In addition the wall thickness of the sleeve shank portion 44 of inner sleeve 16 is considerably less than that of the sleeve shank portion 34 of the outer sleeve. In the embodiment shown the wall thickness of sleeve shank portion 44 was between around 50% and around 55% of the wall thickness of sleeve shank portion 34. By balancing the wall thicknesses such that the outer sleeve shank portion 34 has a maximized wall thickness the strength of the blind head 78 (78') can be optimized.

While a separate stop anvil 18 is believed to be advantageous to provide the functions with the outer sleeve 14 and inner sleeve 16 as described, it is believed that by similarly contouring the nose anvil member 92 of the nose assembly 86 like functions could also be performed whereby the stop anvil 18 could be eliminated.

When the fastener 10 is utilized to join workpieces 66 (66') and 68 (68') made of non-metallic materials such as composites then the outside diameter of the shank portion 34 of outer sleeve 14 can be of a uniform diameter D1, i.e. without the portion of increased diameter D1a, whereby there will be a clearance relationship with the entire length of the bores 72 (72'), 74 (74') prior to installation. In addition a similar configuration with a full clearance relationship could be used with workpieces 66 (66') made of a metallic material. At the same time, the use of mismatched angles A of Aa of the sleeve head portion 36 and countersunk bore portion 75 (75') could be eliminated especially when the workpieces are made of non-metallic materials such as composites.

As noted, while the fastener of the present invention is applicable to applications where access to the workpieces is generally from one side only, with the other side having limited or no access, the fastener can advantageously be used in applications where conventional fasteners requiring access from both sides are used, i.e. a nut and bolt, etc.

It should be noted that while the pin 12 is shown with a pull portion 20 having generally annular pull grooves 22 for engagement by gripping jaws 88 of a pull type installation tool 87 the pull grooves 22 could be of a helical shape adapted for engagement by a similarly helically shaped mating nut member. In that case the relative axial force for installing the fastener (such as fastener 10) could still be applied by a pull type tool or by a torque tool applying torque between the threaded nut and the pull portion of the pin to pull the pin relative to the inner and outer sleeves.

A form of the fastener of the present invention of minimal weight is shown in FIG. 14 where components similar to like components of the fastener of FIGS. 1–13 are given the same numeral designation with the addition of one hundred and unless described otherwise will function in substantially the same manner as their similarly numbered counterparts and, for purposes of simplicity, the description of such like components in FIG. 14 has been minimized or omitted.

Looking now to FIG. 14, the expansion shank portion 124 is of a minimal length just sufficient to provide the desired radial expansion of the sleeve shank portions 34 and 44 of the sleeves 14 and 16, respectively. The reduced length is selected such that, upon final installation, the expansion shank portion 124 will extend axially from a point generally in line with the outer end of the countersunk portion 136 to a location at least in line with or preferably a short distance axially inwardly from the inner end of countersunk head portion 136 to provide support for the head portion 136. The reduction in length of the shank portion 124 will result in an installed fastener of a minimal weight relative to the fastener 10 in the embodiment of FIGS. 1–13. The reduced length shank portion 124 can also be provided with serrations similar to that of serrated portion 32 in the embodiment of FIGS. 1–13. For the sake of simplicity the upper half of FIG. 14 shows the fastener 110 assembled to workpieces 166 and 168 in preparation for installation while the lower half of FIG. 14 shows the fastener 110 after final installation. While the fastener 110 in FIG. 14 has been shown for securing workpieces 166 and 168 of a maximum total thickness, it should be understood that the fastener 110 could also be used with workpieces 166 and 168 having a minimum total thickness similar to that of fastener 10 and as shown in FIGS. 9–13.

Another modified form of fastener of the present invention of maximized strength is shown in FIG. 15 where components similar to like components of the fastener of FIGS. 1–13 are given the same numeral designation with the addition of two hundred and unless described otherwise will function in substantially the same manner as their similar numbered counterparts and, for purposes of simplicity, the description of such like components in FIG. 15 has been minimized or omitted.

Looking now to FIG. 15 the installed fastener 210 includes a pin 212, an outer sleeve 214 and an inner sleeve 216. While not shown, the fastener 210 would also include a stop anvil in the pre-installed condition, such as stop anvil 18. Also the pin 212 in the pre-installed condition would have a pull portion at its forward end with annular pull grooves similar to the pull portion 20 and a breakneck groove similar to breakneck groove 28. The outer sleeve 214 is of a generally cylindrical construction having a shank portion 234 terminating at its forward end in an enlarged protruding type head portion 236.

As noted the blind fastener 210 is adapted for use in securing workpieces together varying in total thickness over a considerable grip range. Looking now to FIG. 15, the fastener 210 is shown in an installed relationship with workpieces 266 and 268 which are of the maximum total thickness of the grip range of the blind fastener 210. The fastener 210 is also shown in installed relationship with workpieces 266' and 268' which are workpieces of the minimum total thickness of workpieces to be secured together by the fastener 210. The front workpiece 266 (166') has an outer or forward surface 270 (270') at the accessible side for the fastener 210 while the rear workpiece 268 (168') has an inner or rearward surface 276 (276') at the inaccessible or blind side for the fastener 210.

The bore 272 (272') in the front workpiece 266 (266') is of a uniform diameter such that the protruding head portion 236 will engage and protrude beyond the outer surface 270 (270').

In the installed condition the bulbed head 278, 278' as formed is in load bearing engagement with the rear surfaces 276, 276' to pull the workpieces 266, 268 and 266', 268' together at a desired clamp load. As can be seen the ring section 226a has been severed and the smooth shank portion 224 has been pulled into the bore 253 of the sleeve shank portion 244 of the inner sleeve 216 to radially expand the sleeve shank portion 244 which in turn, expands the sleeve shank portion 234 of the outer sleeve 214 radially outwardly to fill the clearance between the shank portion 234 and the confronting surfaces of the workpiece bores 272 (272') and 274 (274') providing the desired interference fit with these bore surfaces. Also the roughened or serrated portion 232 at the end of the expansion shank portion 224 has been moved slightly past the severed ring section 226a and into expanded engagement with the confronting portion of the bore 253 of the sleeve shank portion 244 of inner sleeve 216.

In the embodiment of FIG. 15 the expansion shank portion 224 of pin 212 is of an increased length and will be located in bores 272, 274 co-extensively with the entire width of the workpieces 266, 268 in the maximum grip condition and also in bores 272', 274' co-extensively with the entire width of workpieces 266', 268' in the minimum grip condition. At the same time the expansion shank portion 224 is of an increased length to extend into and past the blind head 278 (278') over the grip range to a point proximate to the severed ring section 226a resulting in an installed fastener in which the strength and fatigue characteristics of the blind head 278 (278') are believed to be enhanced.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A fastening system including a fastener for securing a plurality of workpieces together with the workpieces having aligned openings and with the workpieces having a forward surface and a rearward surface, said fastener comprising:

an outer sleeve member having an elongated first sleeve shank terminating at a forward end in a first enlarged sleeve head and having a first bore extending axially therethrough, an inner sleeve member having an elongated second sleeve shank terminating at a rearward end in a second enlarged sleeve head and having a second bore extending axially therethrough, said inner sleeve member being assembled to said outer sleeve member with said second sleeve shank located in said first bore with a close tolerance fit with said second enlarged sleeve head being in confrontation with a rearward end of said first sleeve shank, a pin member having an elongated pin shank, said pin shank having a pull section at its forward end and an enlarged diameter expansion portion at its rearward end, said pin member having a large diameter ring portion located at the juncture of said pull section and said expansion portion, said pin member assembled to said inner and outer sleeve members with said ring portion adapted to be located in a counterbore in said second enlarged head portion and fixedly connected in said counterbore to said inner sleeve member, said pull section being of a length to extend axially outwardly from said first sleeve head and adapted to be gripped by an installation tool whereby a relative axial pulling force can be applied between said pin member and said outer sleeve member, said fastener adapted to be assembled to the workpieces with said first sleeve shank extending through said aligned openings with a predetermined generally clearance relationship, said fastener as assembled to the workpieces having said first sleeve head in engagement with said forward surface of the workpieces and with said rearward end of said outer sleeve extending past said rearward surface of the workpieces, said first sleeve shank having a weakened section selected to be located generally in line with said rearward surface of the workpieces and to expand radially outwardly at a first predetermined magnitude of relative axial force applied between said outer sleeve and said pin member through said ring portion and said second enlarged sleeve head whereby an enlarged bulbed head is formed in engagement with said rearward surface, said second sleeve shank having a length less than the length of said outer sleeve member, said inner sleeve adapted to move relative to said outer sleeve member as said weakened section expands radially outwardly to form said bulbed head, stop means engageable with said inner sleeve member to stop further axial movement of said inner sleeve relative to said outer sleeve after said bulbed head has been fully formed, said ring portion adapted to shear from said pin shank in response to the application of a second predetermined magnitude of relative axial force greater than said first predetermined magnitude to define a separate ring section whereby said expansion portion is moved through said ring section and into said second bore of said inner sleeve, said expansion portion having a diameter greater than that of said second bore to radially expand said second sleeve shank which in turn radially expands said first sleeve shank into radial engagement with the surfaces of the workpiece bores to provide a predetermined interference fit.

2. The fastening system of claim 1 including lock means responsive to engagement of said inner sleeve member with said stop means to form a lock for locking said inner sleeve member and said outer sleeve member together.

3. The fastening system of claim 1 with said stop means comprising a generally annular stop anvil supported on said pin shank at a location adjacent to said first enlarged sleeve head and being engageable with said inner sleeve member to stop further axial movement of said inner sleeve member relative to said outer sleeve member after said blind head has been fully formed.

4. The fastening system of claim 3 including lock means responsive to engagement of said inner sleeve member with said stop means to form a lock for locking said inner sleeve member and said outer sleeve member together.

5. The fastening system of claim 1 for securing workpieces having a preselected total thickness, said pin shank having a breakneck groove located at the end of said pull section, said breakneck groove adapted to fracture at a third preselected magnitude of relative axial force at the conclusion of the installation with said expansion portion remaining in assembled relationship with said inner sleeve member, said expansion portion having a preselected length generally greater than said total thickness of the workpieces, whereby after fracture of said breakneck groove said expansion portion extends generally from a location at the forward surface of the workpieces to a location generally beyond the rearward surface of the workpieces.

6. The fastening system of claim 1 with said pin shank having a breakneck groove located at the end of said pull section, said breakneck groove adapted to fracture at a third preselected magnitude of relative axial force at the conclusion of the installation with said expansion portion remaining in assembled relationship with said inner sleeve member, said expansion portion having a predetermined length whereby after fracture of said breakneck groove said expansion portion extends generally from a location at the forward surface of the workpieces to an axially inward location proximate to the axially inner end of said first sleeve head.

7. The fastening system of claim 1 with said first sleeve shank having an interference portion adjacent said enlarged sleeve head of an increased outside diameter for providing a preselected interference fit with the confronting surface of the workpiece opening proximate to the forward surface, said interference portion being of a substantially limited length to provide only a limited amount of interference with such confronting surface of the workpiece opening immediately adjacent said first enlarged sleeve head.

8. The fastening system of claim 1 with said pin member having a tapered portion connecting said ring portion to said expansion portion with said tapered portion increasing in diameter from said ring portion generally to the enlarged diameter of said expansion portion.

9. The fastening system of claim 8 with the diameter of said tapered portion at said ring portion being generally the diameter of the shear plane of said ring portion.

10. The fastening system of claim 8 with said pin shank having a breakneck groove located at the end of said pull section and adjacent to said ring portion on the opposite axial side of said tapered portion, said breakneck groove adapted to fracture at a third preselected magnitude of relative axial force at the conclusion of the installation with said expansion portion remaining in assembled relationship with said inner sleeve member.

11. The fastening system of claim 1 with said inner sleeve inhibiting further increase of axial load upon said bulbed head upon engagement of said inner sleeve with said stop means.

12. The fastening system of claim 1 with said pin shank having a breakneck groove located at the end of said pull section, said breakneck groove adapted to fracture at a third preselected magnitude of relative axial force at the conclusion of the installation, the fastening system further including first retention means for securing said inner sleeve member and said outer sleeve member together at the conclusion of installation and second retention means for securing said expansion portion to said inner sleeve member upon the conclusion of the installation.

13. The fastening system of claim 1 for securing workpieces having a preselected total thickness, said pin shank having a breakneck groove located at the end of said pull section, said breakneck groove adapted to fracture at a third preselected magnitude of relative axial force at the conclusion of the installation with said expansion portion remaining in assembled relationship with said inner sleeve member, said expansion portion having a preselected length generally greater than said total thickness of the workpieces, whereby after fracture of said breakneck groove said expansion portion extends generally from a location at the forward surface of the workpieces to a location generally beyond the rearward surface of the workpieces, and the fastening system further including first retention means for securing said inner sleeve member and said outer sleeve member together at the conclusion of installation and second retention means for securing said expansion portion to said inner sleeve member upon the conclusion of the installation.

14. The fastening system of claim 1 with said pin shank having a breakneck groove located at the end of said pull section, said breakneck groove adapted to fracture at a third preselected magnitude of relative axial force at the conclusion of the installation with said expansion portion remaining in assembled relationship with said inner sleeve member, said expansion portion having a predetermined length whereby after fracture of said breakneck groove said expansion portion extends generally from a location at the forward surface of the workpieces to a location inwardly generally past said first sleeve head, and the fastening system further including first retention means for securing said inner sleeve member and said outer sleeve member together at the conclusion of installation and second retention means for securing said expansion portion to said inner sleeve member upon the conclusion of the installation.

15. The fastening system of claim 1 with said second sleeve shank of said inner sleeve having a radial wall thickness less than that of said first sleeve shank of said outer sleeve whereby forward extrusion of the material of said second sleeve shank can occur while forward extrusion of the material of the first sleeve shank will be inhibited whereby displacement of said first enlarged sleeve head from engagement with said forward surface of the workpieces is inhibited.

16. The fastening system of claim 1 with said inner sleeve member including retention means for overengaging said ring portion to hold said ring portion in said counterbore of said inner sleeve member and for locking said severed ring section to said counterbore upon the completion of the installation of said fastener.

17. The fastening system of claim 16 with said retention means comprising an end surface of said counterbore extending radially inwardly to overengage said ring portion and defining an arcuate surface to facilitate assembly of said fastener into the workpiece openings.

18. A fastening system including a fastener for securing a plurality of workpieces together with the workpieces having aligned openings and with the workpieces having a forward surface and a rearward surface, said fastener comprising:

an outer sleeve member having an elongated first sleeve shank terminating at a forward end in a first enlarged sleeve head and having a first bore extending axially therethrough, an inner sleeve member having an elongated second sleeve shank terminating at a rearward end in a second enlarged sleeve head and having a second bore extending axially therethrough, said inner sleeve member being assembled to said outer sleeve member with said second sleeve shank located in said first bore with a close tolerance fit with said second enlarged sleeve head being in confrontation with a rearward end of said first sleeve shank, a pin member having an elongated pin shank, said pin shank having a pull section at its forward end and an enlarged diameter expansion portion at its rearward end, said pin member having an engagement portion located at the juncture of said pull section and said expansion portion, said pin member assembled to said inner and outer sleeve members with said engagement portion adapted to be located for engagement with said second enlarged head, said pull section being of a length to extend axially outwardly from said first sleeve head and adapted to be gripped by an installation tool whereby a relative axial pulling force can be applied between said pin member and said outer sleeve member, said fastener adapted to be assembled to the workpieces with said first sleeve shank extending through said aligned openings with a predetermined generally clearance relationship, said fastener as assembled to the workpieces having said first sleeve head in engagement with said forward surface of the workpieces and with said rearward end of said outer sleeve extending past said rearward surface of the workpieces, said first sleeve shank having a weakened section selected to be located generally in line with said rearward surface of the workpieces and to expand radially outwardly at a first predetermined magnitude of relative axial force applied between said outer sleeve and said pin member through said engagement portion and said second enlarged sleeve head whereby an enlarged bulbed head is formed in engagement with said rearward surface, said second sleeve shank having a length less than the length of said outer sleeve member, said inner sleeve adapted to move relative to said outer sleeve member as said weakened section expands radially outwardly to form said bulbed head, stop means engageable with said inner sleeve member to stop further axial movement of said inner sleeve relative to said outer sleeve after said bulbed head has been fully formed, said engagement portion adapted to be moved generally out of load bearing engagement with said second enlarged head in response to the application of a second predetermined magnitude of relative axial force greater than said first predetermined magnitude whereby said expansion portion is moved into said second bore of said inner sleeve, said expansion portion having a diameter greater than that of said second bore to radially expand said second sleeve shank which in turn radially expands said first sleeve shank into radial engagement with the surfaces of the workpiece bores to provide a predetermined interference fit.

19. The fastening system of claim 18 with said engagement portion being a ring portion adapted to shear from said pin shank in response to the application of said second predetermined magnitude of relative axial force.

20. The fastening system of claim 18 including lock means responsive to engagement of said inner sleeve member with said stop means to form a lock for locking said inner sleeve member and said outer sleeve member together.

21. The fastening system of claim 18 with said stop means comprising a generally annular stop anvil supported on said pin shank at a location adjacent to said first enlarged sleeve head and being engageable with said inner sleeve member to stop further axial movement of said inner sleeve member relative to said outer sleeve member after said blind head has been fully formed.

22. The fastening system of claim 21 including lock means responsive to engagement of said inner sleeve member with said stop means to form a lock for locking said inner sleeve member and said outer sleeve member together.

23. The fastening system of claim 18 with said inner sleeve inhibiting further increase of axial load upon said bulbed head upon engagement of said inner sleeve with said stop means.

24. The fastening system of claim 18 with said pin shank having a breakneck groove located at the end of said pull section, said breakneck groove adapted to fracture at a third preselected magnitude of relative axial force at the conclusion of the installation and further including first retention means for securing said inner sleeve member and said outer sleeve member together at the conclusion of installation and second retention means for securing said expansion portion to said inner sleeve member upon the conclusion of the installation.

25. The fastening system of claim 18 for securing workpieces having a preselected total thickness, said pin shank having a breakneck groove located at the end of said pull section, said breakneck groove adapted to fracture at a third preselected magnitude of relative axial force at the conclusion of the installation with said expansion portion remaining in assembled relationship with said inner sleeve member, said expansion portion having a preselected length generally greater than said total thickness of the workpieces, whereby after fracture of said breakneck groove said expansion portion extends generally from a location at the forward surface of the workpieces to a location generally beyond the rearward surface of the workpieces, and further including first retention means for securing said inner sleeve member and said outer sleeve member together at the conclusion of installation and second retention means for securing said expansion portion to said inner sleeve member upon the conclusion of the installation.

26. The fastening system of claim 18 with
said pin shank having a breakneck groove located at the end of said pull section, said breakneck groove adapted to fracture at a third preselected magnitude of relative axial force at the conclusion of the installation with said expansion portion remaining in assembled relationship with said inner sleeve member,
said expansion portion having a predetermined length whereby after fracture of said breakneck groove said expansion portion extends generally from a location at the forward surface of the workpieces to a location inwardly generally past said first sleeve head, and further including first retention means for securing said inner sleeve member and said outer sleeve member together at the conclusion of installation and second retention means for securing said expansion portion to said inner sleeve member upon the conclusion of the installation.

27. A fastening system including a fastener for securing a plurality of workpieces together with the workpieces having aligned openings and with the workpieces having a forward surface and a rearward surface, said fastener comprising:
an outer sleeve member having an elongated first sleeve shank terminating at a forward end in an enlarged sleeve head and having a first bore extending axially therethrough,
an inner sleeve member having an elongated second sleeve shank terminating at a rearward end in an end portion and having a second bore extending axially therethrough,
said inner sleeve member being assembled to said outer sleeve member with said second sleeve shank located in said first bore with a close tolerance fit with said end portion being generally in line with a rearward end of said first sleeve shank,
a pin member having an elongated pin shank,
said pin shank having a pull section at its forward end and an enlarged diameter expansion portion at its rearward end,
said pin member having an engagement portion located at the juncture of said pull section and said expansion portion,
said pin member assembled to said inner and outer sleeve members with said engagement portion adapted to be located for operative engagement relative to said end portion of said second sleeve shank and said rearward end of said first sleeve shank,
said pull section being of a length to extend axially outwardly from said sleeve head and adapted to be gripped by an installation tool whereby a relative axial pulling force can be applied between said pin member and said outer sleeve member,
said fastener adapted to be assembled to the workpieces with said first sleeve shank extending through said aligned openings with a generally predetermined clearance relationship,
said fastener as assembled to the workpieces having said sleeve head in engagement with said forward surface of the workpieces and with said rearward end of said outer sleeve extending past said rearward surface of the workpieces, said first sleeve shank having a weakened section selected to be located generally in line with said rearward surface of the workpieces and to expand radially outwardly at a first predetermined magnitude of relative axial force applied between said outer sleeve and said pin member through said engagement portion and said rearward end of said first sleeve shank whereby an enlarged bulbed head is formed in engagement with said rearward surface,
said second sleeve shank having a length less than the length of said outer sleeve member, said inner sleeve adapted to move relative to said outer sleeve member as said weakened section expands radially outwardly to form said bulbed head,
stop means engageable with said inner sleeve member to stop further axial movement of said inner sleeve relative to said outer sleeve after said bulbed head has been fully formed,
said engagement portion adapted to be moved generally out of operative load bearing engagement relative to said end portion of said second sleeve shank and said rearward end of said first sleeve shank in response to the application of a second predetermined magnitude of relative axial force greater than said first predetermined magnitude whereby said expansion portion is moved into said second bore of said inner sleeve,
said expansion portion having a diameter greater than that of said second bore to radially expand said second sleeve shank which in turn radially expands said first sleeve shank into radial engagement with the surfaces of the workpiece bores to provide a predetermined interference fit.

28. The fastener of claim 27 with said inner sleeve inhibiting further increase of axial load upon said bulbed head upon engagement of said inner sleeve with said stop means.

29. The fastening system of claim 27 with said pin shank having a breakneck groove located at the end of said pull section, said breakneck groove adapted to fracture at a third preselected magnitude of relative axial force at the conclusion of the installation and further including first retention means for securing said inner sleeve member and said outer sleeve member together at the conclusion of installation and second retention means for securing said expansion portion to said inner sleeve member upon the conclusion of the installation.

30. The fastening system of claim 27 for securing workpieces having a preselected total thickness,
said pin shank having a breakneck groove located at the end of said pull section, said breakneck groove adapted to fracture at a third preselected magnitude of relative axial force at the conclusion of the installation with said expansion portion remaining in assembled relationship with said inner sleeve member,
said expansion portion having a preselected length generally greater than said total thickness of the workpieces, whereby after fracture of said breakneck groove said expansion portion extends generally from a location at the forward surface of the workpieces to a location generally beyond the rearward surface of the workpieces, and further including first retention means for securing said inner sleeve member and said outer sleeve member together at the conclusion of installation and second retention means for securing said expansion portion to said inner sleeve member upon the conclusion of the installation.

31. The fastening system of claim 27 with
said pin shank having a breakneck groove located at the end of said pull section, said breakneck groove adapted to fracture at a third preselected magnitude of relative axial force at the conclusion of the installation with said expansion portion remaining in assembled relationship with said inner sleeve member,
said expansion portion having a predetermined length whereby after fracture of said breakneck groove said expansion portion extends generally from a location at the forward surface of the workpieces to a location inwardly generally past said first sleeve head, and further including first retention means for securing said inner sleeve member and said outer sleeve member together at the conclusion of installation and second retention means for securing said expansion portion to said inner sleeve member upon the conclusion of the installation.

32. The fastening system of claim 27 with said second sleeve shank of said inner sleeve having a radial wall thickness less than that of said first sleeve shank of said outer sleeve whereby forward extrusion of the material of said second sleeve shank can occur while forward extrusion of the material of the first sleeve shank will be inhibited whereby displacement of said first enlarged sleeve head from engagement with said forward surface of the workpieces is inhibited.

33. The fastening system of claim 32 with said inner sleeve and said outer sleeve being constructed of materials of generally the same strength with the radial wall thickness of said second sleeve shank of said inner sleeve being around one half of the wall thickness of said first sleeve shank of said outer sleeve.

34. The fastening system of claim 32 with said first enlarged sleeve head of said outer sleeve member having an enlarged counterbore at its outer end,
said stop means comprising a generally annular stop anvil member located adjacent to said counterbore of said first enlarged sleeve head,
said counterbore having a preselected volume substantially sufficient to receive the forwardly extruded material of said second sleeve shank.

35. The fastening system of claim 32 with said first enlarged sleeve head of said outer sleeve member having an enlarged counterbore at its outer end, said stop means comprising a generally annular stop anvil supported on said pin shank at a location adjacent to said counterbore of said first enlarged sleeve head and being engageable with said inner sleeve member to stop further axial movement of said inner sleeve member relative to said outer sleeve member after said blind head has been fully formed, said counterbore having a preselected volume substantially sufficient to receive the forwardly extruded material of said second sleeve shank.

36. The fastening system of claim 35 including lock means responsive to engagement of said inner sleeve member with said stop anvil for moving said inner sleeve member radially outwardly into said counterbore to form a lock for locking said inner sleeve member and said outer sleeve member together.

37. A fastening system including a fastener for securing a plurality of workpieces together with the workpieces having aligned openings and with the workpieces having a forward surface and a rearward surface, said fastener comprising:
an outer sleeve member having an elongated first sleeve shank terminating at a forward end in an enlarged sleeve head and having a first bore extending axially therethrough,
an inner sleeve member having an elongated second sleeve shank terminating at a rearward end in an end portion and having a second bore extending axially therethrough,
said inner sleeve member being assembled to said outer sleeve member with said second sleeve shank located in said first bore with a close tolerance fit with said end portion being generally in line with a rearward end of said first sleeve shank,
a pin member having an elongated pin shank,
said pin shank having a pull section at its forward end and an enlarged diameter expansion portion at its rearward end,
said pin member having an engagement portion located at the juncture of said pull portion and said expansion portion,
said pin member assembled to said inner and outer sleeve members with said engagement portion adapted to be located for operative engagement relative to said end portion of said second sleeve shank and said rearward end of said first sleeve shank,
said pull section being of a length to extend axially outwardly from said sleeve head and adapted to be gripped by an installation tool whereby a relative axial pulling force can be applied between said pin member and said outer sleeve member,
said fastener adapted to be assembled to the workpieces with said first sleeve shank extending through said aligned openings with a generally predetermined clearance relationship,
said fastener as assembled to the workpieces having said sleeve head in engagement with said forward surface of the workpieces and with said rearward end of said outer sleeve extending past said rearward surface of the workpieces,
said first sleeve shank having a head forming section selected to be located generally in line with said rearward surface of the workpieces and to expand radially outwardly at a first predetermined magnitude of relative axial force applied between said outer sleeve and said pin member through said engagement portion and said rearward end of said first sleeve shank whereby an enlarged blind head is formed in engagement with said rearward surface,
said second sleeve shank having a length less than the length of said outer sleeve member, said inner sleeve adapted to move relative to said outer sleeve member as said head forming section expands radially outwardly to form said blind head,
stop means engageable with said inner sleeve member to stop further axial movement of said inner sleeve relative to said outer sleeve after said bulbed head has been fully formed,
said engagement portion adapted to be moved generally out of operative load bearing engagement relative to said end portion of said second sleeve shank and said rearward end of said first sleeve shank in response to the application of a second predetermined magnitude of relative axial force greater than said first predetermined magnitude whereby said expansion portion is moved into said second bore of said inner sleeve,
said expansion portion having a diameter greater than that of said second bore to radially expand said second sleeve shank which in turn radially expands said first sleeve shank into radial engagement with the surfaces of the workpiece bores to provide a predetermined interference fit, said second sleeve shank of said inner sleeve having a radial wall thickness less than that of said first sleeve shank of said outer sleeve whereby forward extrusion of the material of said second sleeve shank can occur while forward extrusion of the material of the first sleeve shank will be inhibited whereby displacement of said first enlarged sleeve head from engagement with said forward surface of the workpieces is inhibited.

38. The fastening system of claim 37 with said inner sleeve and said outer sleeve being constructed of materials of generally the same strength with the radial wall thickness of said second sleeve shank of said inner sleeve being around one half of the wall thickness of said first sleeve shank of said outer sleeve.

39. The fastening system of claim 37 with said first enlarged sleeve head of said outer sleeve member having an enlarged counterbore at its outer end, said stop means comprising a generally annular stop anvil member located adjacent to said counterbore of said first enlarged sleeve head, said counterbore having a preselected volume substantially sufficient to receive the forwardly extruded material of said second sleeve shank.

40. The fastening system of claim 37 with said first enlarged sleeve head of said outer sleeve member having an enlarged counterbore at its outer end, said stop means comprising a generally annular stop anvil supported on said pin shank at a location adjacent to said counterbore of said first enlarged sleeve head and being engageable with said inner sleeve member to stop further axial movement of said inner sleeve member relative to said outer sleeve member after said blind head has been fully formed, said counterbore having a preselected volume substantially sufficient to receive the forwardly extruded material of said second sleeve shank.

41. The fastening system of claim 40 including lock means responsive to engagement of said inner sleeve member with said stop anvil for moving said inner sleeve member radially outwardly into said counterbore to form a lock for locking said inner sleeve member and said outer sleeve member together.

* * * * *